United States Patent [19]
Ishikawa et al.

[11] Patent Number: 5,874,020
[45] Date of Patent: Feb. 23, 1999

[54] NI-ZN BASE FERRITE

[75] Inventors: Katsuhisa Ishikawa; Yasuhiro Sasaki; Atsushi Ochi; Yoshitsugu Okada; Mitsuru Furuya, all of Tokyo, Japan

[73] Assignee: NEC Corporation, Tokyo, Japan

[21] Appl. No.: 851,716

[22] Filed: May 5, 1997

[30] Foreign Application Priority Data

Nov. 25, 1996 [JP] Japan .................................. 8-313462

[51] Int. Cl.$^6$ .................................. C04B 35/30
[52] U.S. Cl. .................................. 252/62.62; 252/62.59
[58] Field of Search .................................. 252/62.62, 62.59

[56] References Cited

FOREIGN PATENT DOCUMENTS 54-159696  12/1979  Japan .
63-260006  10/1988  Japan .

OTHER PUBLICATIONS 61-51405 Nov. 8, 1986 Japan.

Bhise et al, "Role of MnTi and MnSn Substitutions on the Electrical Properties of Ni–Zn Ferrites", Phy. Stat. Sol.(a), 157, pp. 411–419, Oct. 1996.

*Primary Examiner*—Melissa Bonner
*Attorney, Agent, or Firm*—Sughrue, Mion, Zinn, Macpeak & Seas, PLLC

[57] ABSTRACT

A Ni—Zn base ferrite is provided with a relatively small dielectric loss ($\tan\delta(\epsilon)$) of the order of $10^{-3}$. Its saturation magnetization ($4\pi Ms$) is relatively still high. A Ni—Zn base ferrite having a small dielectric loss (of the order of $10^{-3}$) can be obtained by proportioning raw materials to give a finished composition range of $Ni_XZn_{1-X}Fe_{2-Y-Z}Mn_YM_ZO_4$ where M: Ge and/or Sn, $0.55 \leq X \leq 1.00$, $0.001 \leq Y \leq 0.36$, and $0.002 \leq Z \leq 0.36$, by calcination.

11 Claims, No Drawings

NI-ZN BASE FERRITE

BACKGROUND OF THE INVENTION

1. Field of the Invention

This invention relates to a Ni—Zn base ferrite, and especially to a Ni—Zn base ferrite which is small in dielectric loss and high in saturation magnetization and is useful as a magnetic material in high-frequency fields.

Ni—Zn base ferrites are expected to find utility in many fields, for example, as core materials for screw cores, radios and other household electric appliances, high-frequency core materials, and magnetic materials for isolators, circulators and other high-frequency band products all of which make use of gyromagnetic effect. They are also examples of representative ferrite materials which are employed in devices such as circulators for microwave communication.

As a magnetic material usable for such application purposes, it is essential to select a material having a saturation magnetization ($4\pi Ms$) of from 500 to 5,000 (gauss) and a small ferromagnetic resonance absorption half-value width ($\Delta H$) and, from the standpoint of assurance of reliability, a small dielectric loss [$\tan \delta(\epsilon)$].

2. Description of the Related Art

The history of ferrites goes back many years. Developed as hard ferrites include Co-base ferrites, Ba-base ferrites, and Sr-base ferrites. As soft ferrites, on the other hand, Mg-base ferrites, Cu-base ferrites, Zn-base ferrites, Ni—Zn base ferrites and the like have been developed, followed by the development of Mn-Zn base ferrites.

Mg-base ferrites still remain as Mn-Mg-Zn base ferrites, which make use of rectangular hysteresis characteristics of the Mg-base ferrites and are used primarily in television sets (as deflection cores and flyback cores).

Concerning Cu-base ferrites, attempts were made at the time of their development to use them as memory elements in large scale computers. They were however accompanied by the problem that their structure at 1,000° C. or higher had to be retained at room temperature. There was then a move toward the mass production of very small cores. As analog memory elements, they soon confronted their limitations.

Around that time, ICs, LSIs and the like were developed. A trend toward digital memories became a mainstream, and with this the era of analog memory elements came to an end.

Subsequent to the discovery of magnetic properties of Ni—Zn ferrites over a low frequency to high frequency range and their gyromagnetic effect, systematic and extensive research was conducted on them. They however had large magnetic losses. A great deal of efforts was hence concentrated on the improvement of their magnetic losses, but this problem has remained unresolved.

Ni—Zn ferrites offer the superior qualities as described above and specifically, they feature excellent magnetic properties over a low frequency to high frequency range, a small ferromagnetic resonance absorption half-value width $\Delta H$, gyromagnetic effect, mild and flexible production conditions, and superior property reproducibility and stability. It is therefore clear that they will be used as primary magnetic materials in high-frequency fields once their dielectric losses $\tan \delta(\epsilon)$ are improved.

Conventional Ni—Zn ferrites have dielectric losses $\tan \delta(\epsilon)$ as large as $1 \times 10^{-2}$ or so, thereby making their application in magnetic devices difficult.

SUMMARY OF THE INVENTION

With the foregoing problems in view, the present invention has as an object the provision of a Ni—Zn base ferrite having a small dielectric loss $\tan \delta(\epsilon)$ of the order of $10^{-3}$ or smaller.

To achieve the above-described object, the present invention provides a Ni—Zn base ferrite having a compositional formula represented by $Ni_X Zn_{1-X}\text{-}Fe_{2-Y-Z} Mn_Y M_Z O_4$ where M: at least one of Ge and Sn, $0.55 \leq X \leq 1.00$, $0.001 \leq Y \leq 0.36$, and $0.002 \leq Z \leq 0.36$.

It is for the below-described reasons that X, Y and Z in the above compositional formula are limited as defined above.

Concerning X which indicates the proportion of nickel (Ni), a value smaller than 0.55 leads to a lower Curie temperature ($T_c$) and in view of the temperature stability required for a magnetic device upon actual use, such a low X value cannot provide a Ni—Zn base ferrite suitable for actual use.

Turning next to Y which is indicative of the proportion of manganese (Mn), a value smaller than 0.001 results in a large dielectric loss $\tan \delta(\epsilon)$ (as large as $1 \times 10^{-2}$) while a value greater than 0.36 leads to a saturation magnetization $4\pi Ms$ as small as 300 (G) and also to a low Curie temperature ($T_c$). A Y value outside the range of $0.001 \leq Y \leq 0.36$ therefore has difficulty in providing a Ni—Zn base ferrite suitable for actual use.

Z indicates the proportion of M (=Ge and/or Sn). A Z value within the range of $0.002 \leq Z \leq 0.36$ can suppress a loss associated with an electric conduction which in turn takes place within the material. The dielectric loss $\tan \delta(\epsilon)$ is therefore reduced to the order of $10^{-3}$ or less.

Further, it is necessary to use Mn and M (=Ge and/or Sn) in combination.

The present invention is therefore limited to the Ni—Zn base ferrite of the above compositional formula in which, as described above, X, Y and Z fall within the following ranges: $0.55 \leq X \leq 1.00$, $0.001 \leq Y \leq 0.36$, and $0.002 \leq Z \leq 0.36$.

Incidentally, when proportioned to give a compositional formula represented by $Ni_{0.6}Zn_{0.4}Fe_{1.54}\text{-}Mn_{0.1}M_{0.36}O_4$, a Ni—Zn base ferrite having a still smaller dielectric loss tan $\delta(\epsilon)$ ($1 \times 10^{-4}$) can be obtained.

DETAILED DESCRIPTION OF THE INVENTION

Embodiments of the present invention will hereinafter be described based on certain working examples to be described subsequently herein.

Table 1 shows the compositional formulas of the embodiments and the saturated magnetizations $4\pi Ms$, dielectric losses $\tan \delta(\epsilon)$ and Curie temperatures ($T_c$) of ferrites of the various compositions prepared in the respective invention examples in comparison with those of non-invention examples (comparative examples).

As described above, each Ni—Zn base ferrite according to the present invention is represented by the compositional formula $Ni_X Zn_{1-X} Fe_{2-Y-Z} Mn_Y M_Z O_4$ where M: at least one of Ge and Sn. Moreover, X, Y and Z should fall within the following specific ranges: $0.55 \leq X \leq 1.00$, $0.001 \leq Y \leq 0.36$, and $0.002 \leq Z \leq 0.36$.

In Table 1, the ferrites having the compositions designated by Test Nos. 1 to 23 are examples according to the present invention, whereas Test Nos. 24 to 30 are comparative examples directed to compositions outside the scope of the present invention.

The above ferrites of the various compositions were each prepared as will be described next.

As raw materials for the ferrite material, a manganese carbonate was chosen as a manganese source and oxides were selected as sources for the remaining elements. Subsequent to proportioning of these raw materials, the resulting powder batch was mixed for 64 hours in an iron-made ball mill, pre-calcined at 850° C. for 2 hours in an oxygen atmosphere, and then ground and mixed again.

A binder (polyvinyl alcohol) was then added. The resulting mixture was press-formed into a predetermined shape under a pressure of 2.0 tons per unit area (cm$^2$). The green body so obtained was degreased, followed by sintering at 1,200° to 1,450° C. for 2 hours in an oxygen atmosphere.

The saturation magnetization $4\pi Ms$ was determined by preparing a sample of 10 mm in diameter and 1.5 mm in thickness in the above-described manner, obtaining a hysteresis curve up to a maximum magnetic field of 10 kilogauss by using a vibrating sample magnetometer (VSM), and then determining magnetization at a magnetic field of 0 from the resultant hysteresis curve by extrapolation.

The dielectric loss tan $\delta(\epsilon)$ was determined by preparing a measuring sample of 16 mm in diameter and 0.2 mm in thickness in the above-described manner and then measuring its dielectric loss in an electromagnetic radiation of 9 GHz by the TE112 mode cavity resonance method. Further, the Curie temperature $T_c$ was determined by preparing a ball of 1 to 2 mm in diameter in the above-described manner and then measuring its Curie temperature by a magnetic balance.

EXAMPLES (Test Nos. 1 to 23)

Test Nos. 1 to 5 in Table 1 show that a value of X, which is indicative of the proportion of Ni, in the range of Further, Test Nos. 6 to 23 in Table 1 show that values of Y and Z, which indicate the proportions of Mn and M (M: Ge and/or Sn), in the ranges of $0.001 \leq Y \leq 0.36$ and $0.002 \leq Z \leq 0.36$, respectively, give a dielectric loss tan $\delta(\epsilon)$ of the order of $10^{-3}$ or less, a Curie temperature $T_c$ of from 110° to 440° C. and a saturation magnetization $4\pi Ms$ of from 500 to 5,200 (G).

COMPARATIVE EXAMPLES (Test Nos. 24 to 30)

In each of Test Nos. 24 to 30 in Table 1, one or more of the X, Y and Z values fall outside the above-described specific ranges (comparative examples), that is, one or more of the Curie temperature $T_c$, saturation magnetization $4\pi Ms$ and dielectric loss tan $\delta(\epsilon)$ do not show any values within the prescribed ranges. The samples of these test numbers are therefore not suited for practical applications.

By limiting in a Ni—Zn base ferrite the proportion ranges of Ni, Zn, Fe, Mn and M (M: Ge and/or Sn) as described above, the present invention can provide the Ni—Zn base ferrite with a dielectric loss tan $\delta(\epsilon)$ of the order of $10^{-3}$, which is smaller than those of conventional products, while assuring a high value as its saturation magnetization $4\pi Ms$. The Ni—Zn base ferrite according to the present invention can therefore be used in low-loss magnetic devices, thereby bringing about a significant industrial value.

TABLE 1

| | Compositional Formula | T. c(°C.) | $4\pi Ms(G)$ | $\tan\delta(\epsilon)$ |
|---|---|---|---|---|
| 1 | $Ni_{0.55} Zn_{0.45} Fe_{1.84} Mn_{0.06} Ge_{0.05} Sn_{0.05} O_4$ | 100 | 2500 | $4 \times 10^{-4}$ |
| 2 | $Ni_{0.7} Zn_{0.3} Fe_{1.84} Mn_{0.06} Ge_{0.05} Sn_{0.05} O_4$ | 250 | 3100 | $9 \times 10^{-4}$ |
| 3 | $Ni_{0.6} Zn_{0.4} Fe_{1.84} Mn_{0.06} Ge_{0.05} Sn_{0.05} O_4$ | 370 | 4400 | $9 \times 10^{-4}$ |
| 4 | $Ni_{1.0} Zn_{0.4} Fe_{1.84} Mn_{0.06} Ge_{0.05} Sn_{0.05} O_4$ | 480 | 2200 | $2 \times 10^{-3}$ |
| 5 | $Ni_{0.6} Fe_{1.84} Mn_{0.06} Ge_{0.05} Sn_{0.005} O_4$ | 580 | 1600 | $3 \times 10^{-3}$ |
| 6 | $Ni_{0.6} Zn_{0.4} Fe_{1.997} Mn_{0.001} Ge_{0.001} Sn_{0.001} O_4$ | 440 | 5200 | $8 \times 10^{-3}$ |
| 7 | $Ni_{0.6} Zn_{0.4} Fe_{1.92} Mn_{0.02} Ge_{0.03} Sn_{0.03} O_4$ | 370 | 4800 | $4 \times 10^{-3}$ |
| 8 | $Ni_{0.6} Zn_{0.4} Fe_{1.84} Mn_{0.01} Ge_{0.03} Sn_{0.03} O_4$ | 340 | 4400 | $5 \times 10^{-3}$ |
| 9 | $Ni_{0.6} Zn_{0.4} Fe_{1.7} Mn_{0.1} Ge_{0.1} Sn_{0.1} O_4$ | 280 | 3500 | $9 \times 10^{-4}$ |
| 10 | $Ni_{0.6} Zn_{0.4} Fe_{1.63} Mn_{0.11} Ge_{0.13} Sn_{0.13} O_4$ | 250 | 3100 | $5 \times 10^{-4}$ |
| 11 | $Ni_{0.6} Zn_{0.4} Fe_{1.5} Mn_{0.20} Ge_{0.09} Sn_{0.21} O_4$ | 200 | 2200 | $1 \times 10^{-4}$ |
| 12 | $Ni_{0.6} Zn_{0.4} Fe_{1.5} Mn_{0.25} Ge_{0.2} Sn_{0.05} O_4$ | 190 | 2100 | $2 \times 10^{-4}$ |
| 13 | $Ni_{0.6} Zn_{0.4} Fe_{1.184} Mn_{0.3} Ge_{0.1} Sn_{0.2} O_4$ | 160 | 1400 | $1 \times 10^{-4}$ |
| 14 | $Ni_{0.6} Zn_{0.4} Fe_{1.28} Mn_{0.36} Ge_{0.22} Sn_{0.14} O_4$ | 110 | 500 | $1 \times 10^{-4}$ |
| 15 | $Ni_{0.6} Zn_{0.4} Fe_{1.44} Mn_{0.2} Ge_{0.18} Sn_{0.18} O_4$ | 130 | 1700 | $1 \times 10^{-4}$ |
| 16 | $Ni_{0.6} Zn_{0.4} Fe_{1.54} Mn_{0.11} Ge_{0.3} Sn_{0.05} O_4$ | 200 | 2500 | $5 \times 10^{-4}$ |
| 17 | $Ni_{0.6} Zn_{0.4} Fe_{1.54} Mn_{0.11} Ge_{0.05} Sn_{0.3} O_4$ | 210 | 2500 | $4 \times 10^{-4}$ |
| 18 | $Ni_{0.6} Zn_{0.4} Fe_{1.54} Mn_{0.1} Sn_{0.36} O_4$ | 230 | 2700 | $1 \times 10^{-4}$ |
| 19 | $Ni_{0.6} Zn_{0.4} Fe_{1.54} Mn_{0.1} Ge_{0.36} O_4$ | 240 | 2700 | $1 \times 10^{-4}$ |
| 20 | $Ni_{0.6} Zn_{0.4} Fe_{1.94} Mn_{0.05} Sn_{0.01} O_4$ | 360 | 400 | $3 \times 10^{-3}$ |
| 21 | $Ni_{0.6} Zn_{0.4} Fe_{1.88} Mn_{0.05} Sn_{0.07} O_4$ | 340 | 4700 | $6 \times 10^{-3}$ |
| 22 | $Ni_{0.6} Zn_{0.4} Fe_{1.94} Mn_{0.05} Ge_{0.01} O_4$ | 370 | 400 | $2 \times 10^{-3}$ |
| 23 | $Ni_{0.6} Zn_{0.4} Fe_{1.88} Mn_{0.05} Ge_{0.07} O_4$ | 350 | 4700 | $5 \times 10^{-3}$ |
| 24 | $Ni_{0.5} Zn_{0.4} Fe_{1.7} Mn_{0.1} Ge_{0.1} Sn_{0.1} O_4$ | 50 | 2300 | $2 \times 10^{-4}$ |
| 25 | $Ni_{0.6} Zn_{0.4} Fe_{1.9975} Mn_{0.0005} Ge_{0.001} Sn_{0.001} O_4$ | 440 | 5200 | $1 \times 10^{-2}$ |
| 26 | $Ni_{0.6} Zn_{0.4} Fe_{1.998} Mn_{0.001} Ge_{0.0005} Sn_{0.0005} O_4$ | 440 | 5200 | $2 \times 10^{-2}$ |
| 27 | $Ni_{0.6} Zn_{0.4} Fe_{1.26} Mn_{0.46} Ge_{0.14} Sn_{0.14} O_4$ | 90 | 300 | $1 \times 10^{-4}$ |
| 28 | $Ni_{0.6} Zn_{0.4} Fe_{1.26} Mn_{0.26} Ge_{0.1} Sn_{0.38} O_4$ | 70 | 300 | $1 \times 10^{-4}$ |
| 29 | $Ni_{0.6} Zn_{0.4} Fe_{1.26} Mn_{0.26} Ge_{0.38} Sn_{0.1} O_4$ | 90 | 300 | $1 \times 10^{-4}$ |
| 30 | $Ni_{0.6} Zn_{0.4} Fe_2 O_4$ | 450 | 5250 | $1 \times 10^{-2}$ |

$0.55 \leq X \leq 1.00$ gives a Curie temperature $T_c$ of from 100° to 580° C., a saturation magnetization $4\pi Ms$ of from 1,600 to 4,400 (G) and a dielectric loss tan $\delta(\epsilon)$ of the order of $10^{-3}$ or less.

We claim:

1. A Ni—Zn base ferrite having a compositional formula represented by $Ni_X Zn_{1-X} Fe_{2-Y-Z} Mn_Y M_Z O_4$ wherein M is at least one element selected from the group consisting of Ge and Sn, wherein $0.55 \leq X \leq 1.00$, $0.001 \leq Y \leq 0.36$, and $0.002 \leq Z \leq 0.36$ and wherein Y and Z are different.

2. A Ni—Zn base ferrite having a compositional formula represented by $Ni_{0.6}Zn0.4Fe_{1.54}Mn_{0.1}M_{0.36}O_4$ one element selected from the group consisting of Ge and Sn.

3. A Ni—Zn base ferrite having a compositional formula represented by $Ni_XZn_{1-X}Fe_{2-Y-Z}Mn_YM_ZO_4$ wherein M is Ge or Ge and Sn, and wherein $0.55 \leq X \leq 1.00$, $0.001 \leq Y \leq 0.36$, and $0.002 \leq Z \leq 0.36$.

4. A Ni—Zn base ferrite according to claim 1, wherein M is Sn.

5. A Ni—Zn base ferrite according to claim 1, wherein M is Ge.

6. A Ni—Zn base ferrite according to claim 1, wherein M is Ge and Sn.

7. A Ni—Zn base ferrite according to claim 2, wherein M is Sn.

8. A Ni—Zn base ferrite according to claim 2, wherein M is Ge.

9. A Ni—Zn base ferrite according to claim 2, wherein M is Ge and Sn.

10. A Ni—Zn base ferrite according to claim 3, wherein M is Ge.

11. A Ni—Zn base ferrite according to claim 3, wherein M is Ge and Sn.

* * * * *